Oct. 7, 1969     F. A. DAVIS, JR     3,470,795
METHOD AND APPARATUS FOR MAKING PLASTIC BAGS
Filed Aug. 30, 1967     2 Sheets-Sheet 1
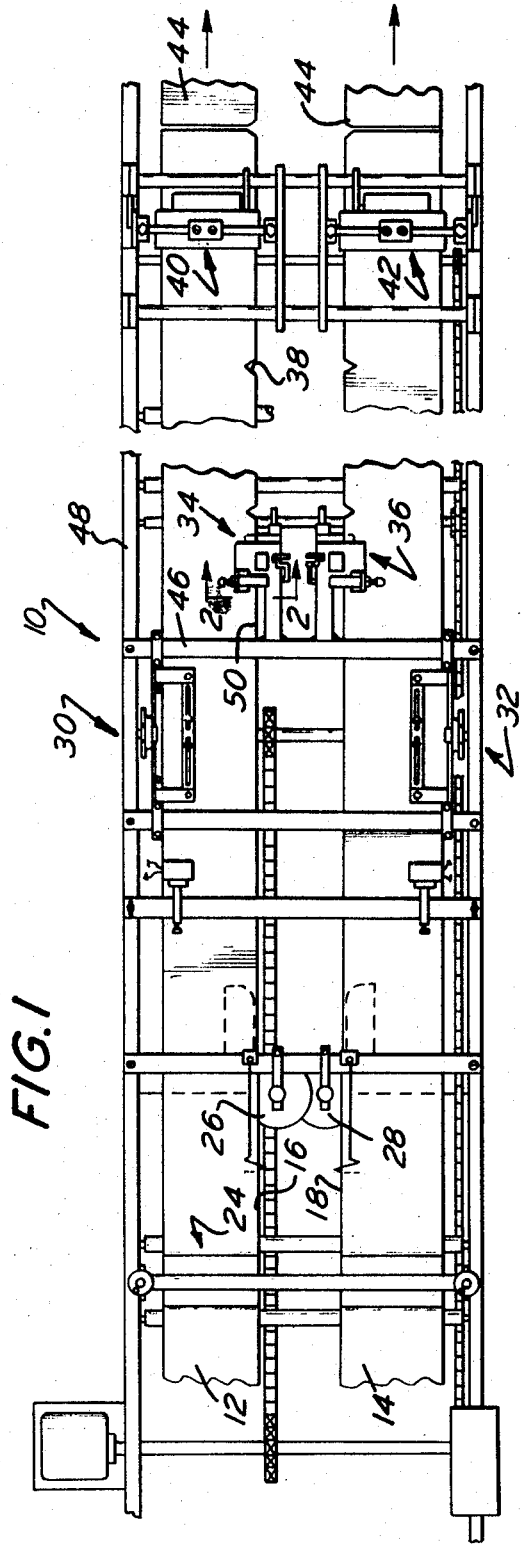
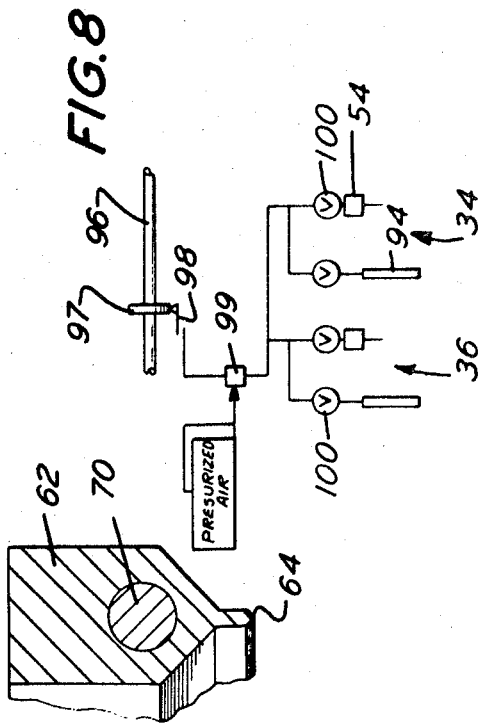
INVENTOR
FRANCIS A. DAVIS, JR.
BY Seidel & Gonda
ATTORNEYS.

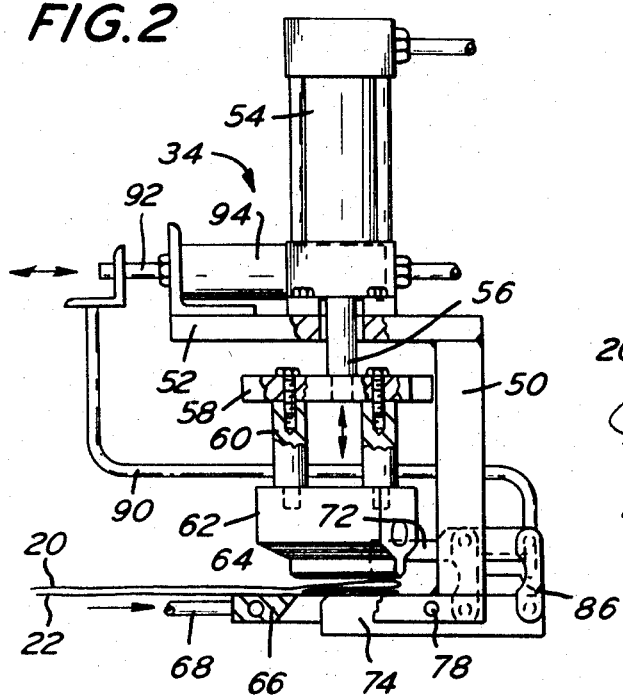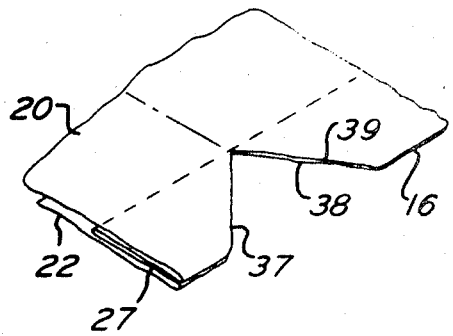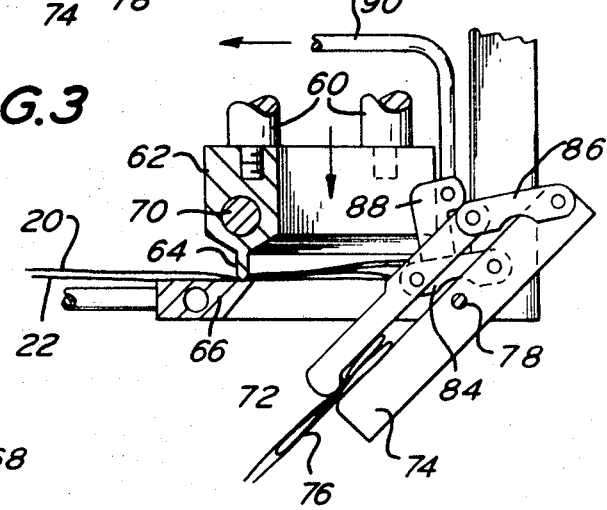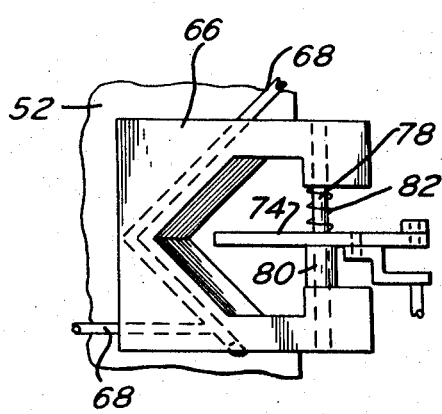

United States Patent Office 3,470,795
Patented Oct. 7, 1969

3,470,795
METHOD AND APPARATUS FOR MAKING PLASTIC BAGS
Francis A. Davis, Jr., Lansdale, Pa., assignor to Paramount Packaging Corp., Chalfont, Pa., a corporation of Pennsylvania
Filed Aug. 30, 1967, Ser. No. 664,476
Int. Cl. B31b 1/00; B32b 31/18; B26b 7/06
U.S. Cl. 93—8                                                    10 Claims

ABSTRACT OF THE DISCLOSURE

Method and apparatus for intermittently providing notches defined by seam welds at the fold line of thermoplastic material with subsequent transverse cutting and seam welding of the material at the apex of each notch is disclosed.

---

This invention relates to a method and apparatus for making bags similar to that disclosed in U.S. Patent 3,282,173. The machine in that patent manufactures open gusset bottom bags having square corners. The present invention is directed to method and apparatus for making modified or shaped gusset bags having beveled or rounded corners. Modified or shaped gusset bags are desirable since they enable the bag to more closely conform to the shape of the article placed therein. For example, when a round object is placed in a square bag, the object is permitted to move in the bag and a substantial portion of the bag is unused.

The present invention accomplishes the object of making modified or shaped bottom gusset bags in a manner which is simple, reliable, inexpensive, and lends itself to high speed production rates. In practicing the present invention, generally V-shaped notches are intermittently provided at the fold line of thermoplastic sheet material by seam welds. Subsequent operations include cutting the material transversely and simultaneously effecting a seam weld at the apex of each notch.

When providing notches in the thermoplastic material a small generally triangular-shaped tab is produced simultaneously with the provision of the seam welds defining the notch. The thinness of the material which is commercially used and the large amount of static electricity involved therewith, tends to cause the tabs to stick to various parts of the machinery and accumulate in a manner which interferes with proper functioning of the machinery. Hence, a positive means is provided to remove the cut-out tab.

It is an object of the present invention to provide method and/or apparatus for intermittently making notches defined by seam welds at the fold line of thermoplastic material so that the material may be subsequently cut transversely and simultaneously seam welded at the apex of each notch.

It is another object of the present invention to provide novel method and apparatus for making a modified bottom gusset bag.

It is another object of the present invention to provide novel apparatus and method for making a modified bottom gusset bag of thermoplastic material in a manner which is simple, reliable, and lends itself to high speed production.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top plan view of the apparatus of the present invention.

FIGURE 2 is a sectional view taken along the line 2—2 in FIGURE 1 and showing the notch welder on an enlarged scale.

FIGURE 3 is an enlarged detail view of the bottom portion of the notch welder shown in FIGURE 2 with the fingers shown in a position wherein they support a removed tab.

FIGURE 4 is a partial bottom plan view of the anvil shown in FIGURE 2.

FIGURE 5 is a plan view of the die cutting head.

FIGURE 6 is a sectional view taken along the line 6—6 in FIGURE 5.

FIGURE 7 is a partial perspective view of the notched web of thermoplastic sheet material.

FIGURE 8 is a schematic diagram for operating the cylinders of the notch welder.

Referring now to the drawings in detail wherein like numerals indicate like elements, there is shown a bag making machine of the present invention designated generally as 10. The machine 10 is intended to have fed therethrough a pair of spaced parallel thermoplastic webs 12 and 14. Thus, the machine 10 has two parallel production lines, each defined by one of the webs. The webs 12 and 14 are folded over sheets of thermoplastic material having a single fold line 16 and 18 respectively. Along the length of the webs, there is printed markers for breaking the beam of photocell units which intermittently operate the machine 10.

Since each of the webs 12 and 14 are treated in the same manner, only web 12 will be described in detail. It will be understood that the corresponding structure illustrated is utilized in conjunction with web 14. From large rolls, the web 12 is unwound and fed through a take-up roll assembly 24 in a folded manner so as to have a top layer 20 and a bottom layer 22 connected together along the fold line 16. From the assembly 24, a bottom gusset is provided by the plate 26. A similar plate 28 is provided for web 14. The gusset plates 26 and 28 may be of the type as shown in the above-mentioned patent.

The gusseted web 12 is then fed in a manner so that a protruding edge portion is provided as shown in the above-mentioned patent so that perforations or slits may be provided by the slitter 30. A similar slitter 32 is provided for web 14. The slitter may be of the type shown in U.S. Patent 3,183,750 which is useful for producing bags of the type shown in U.S. Patent 3,184,055.

Thereafter, the webs are fed to intermittently operated notch welders 34 and 36 respectively. The welders provide notches 38 defined by seam welds 37 and 39 at spaced points along the length of the fold line 16. See FIGURE 7. Thereafter, the webs 12 and 14 are fed to intermittent side seam welder and cutters 40 and 42, respectively, each of which may be of the type shown in U.S. Patent 2,947,345. Each of the welder and cutters 40 and 42 provide a seam weld defining a side edge of the bag which coincides with the apex of the notches 38, thereby dividing the webs 12 and 14 into individual bags 44.

As shown more clearly in FIGURE 1, the machine 10 includes a frame having a cross brace 46. The cross brace 46 supports the notch welders 34 and 36. As shown more clearly in FIGURE 2, the notch welder 34 includes a support 50 having a horizontal platform 52. A cylinder 54 is supported by the platform 52. A motive fluid such as air is adapted to be introduced into the cylinder 54 to cause reciprocation of a piston therein. The piston is provided with a piston rod 56.

The piston rod 56 extends through a hole in the platform 52 and is connected at its lower end to a plate 58. Plate 58 is connected to a die head 62 by means of a plurality of spacers 60 which have a low heat transfer rate. Die head 62 is generally V-shaped in plan view and is provided with a similarly contoured cutting edge 64, see FIGURE 5. Die head 62 is heated by means of a conventional cartridge heater 70.

Below the die head 62, there is supported an anvil 66 which is co-extensive with the cutting edge 64. A coolant conduit 68 extends through the anvil 66 so as to provide a generally V-shaped cooled zone co-extensive with the cutting edge 64.

A pair of fingers or jaws 72 and 74 are provided for extending into the die head 62 and anvil 66. The fingers are adapted to grasp the severed tab 76 and physically discharge the same downwardly to a collection basket or the like. Finger 74 is pivotably supported by rod 78. A spring 82 biases the finger 74 against a bushing 80.

FIGURE 72 is connected to finger 74 by a pair of parallelogram links 84 and 86. Each end of each link is pivotably connected to one of the fingers. An extension 88 is rigid with link 84. The end of extension 88 remote from link 84 is pivotably connected to one end of rod 90. The other end of rod 90 is rigidly connected to a piston disposed within cylinder 94 which is supported by platform 52. The longitudinal axes of the cylinders 54 and 94 are perpendicular to each other and perpendicular to the path of travel of the web 12.

As shown more clearly in FIGURE 8, the machine 10 includes a cam shaft 96 having a cam 97 thereon. The cam 97 is adapted to actuate a switch 98 for controlling operation of a solenoid operated valve 99. Valve 99 controls flow of motive fluid to the cylinders 54 and 94 of each of the notch welders 34 and 36. Flow control valves 100 are provided for each of the cylinders as illustrated in FIGURE 8.

The machine 10 and the sequence of method steps forming a part of the present invention are as follows:

The first step in practicing the invention is to feed the web of thermoplastic sheet material overlapped on itself so as to have a fold line. Thereafter, a gusset is provided at the fold line 16 by gusset plate 26. The thusly orientated web 12 of sheet material is cut at the welder 34 so as to provide a generally V-shaped notch 38 at spaced points therealong and simultaneously seam-welded at the edges defining the notches 38.

As shown more clearly in FIGURE 7, the notch 38 is defined by the seam welds 37 and 39. It will be understood that the terminology "generally V-shaped notch" will be interpreted as being a V-shaped notch or a notch having curved sides so as to be a modified V-shape.

The notches 38 are applied to the web 12 at spaced points along the fold lines 16 by the cutting edge 64 on the die head 62. Cutting edge 64 is reciprocated toward the anvil 66 each time the movement of the web 12 is stopped. Movement of the cutting edge 64 is effected by introducing motive fluid into the cylinder 54. This is accomplished by closing switch 98 by cam 97 on cam shaft 96. This completes the circuit to the solenoid controlling valve 99 which in turn permits introduction of motive fluid such as air into the cylinders 54 and 94.

At the same time that the die head 62 moves downwardly, introduction of motive fluid into cylinder 94 causes piston rod 92 and connecting rod 90 to reciprocate to the left in FIGURE 2. Such reciprocation of rod 90 causes arm 72 to move to the left in FIGURE 2 and then downwardly into contact with the tab 76. Continued movement of the rod 90 to the left in FIGURE 2 causes the fingers 72 and 74 to pivot downwardly as shown in FIGURE 3. This positive manipulation of the tab 76 assures that the tab will be moved away from the web and mechanisms contacting the web so as to prevent the tab from adhering to surfaces due to static friction.

As soon as switch 98 is opened, the motive fluid is permitted to escape from the cylinders 54 and 94. As a result thereof, springs, not shown, cause the piston rods 56 and 92 to assume their position shown in FIGURE 2. As the fingers 72 and 74 pivot from the position shown in FIGURE 3, the finger 72 moves first and permits the tab 76 to fall due to gravity into a collection basket.

The heat necessary to effect a seam weld and simultaneously cut the four layers of thermoplastic material is provided by the heater 70. To assure that there will be a weld made within the allotted time period during which the web 12 is stationary, the anvil 66 is internally cooled. During the period where the web 12 is stationary, the web is slit by slitter 30, notched by notch welder 34, and transversely cut and seam welded by welder-cutter 40. All of these mechanisms are synchronized for simultaneous contact with the web when the web is stationary. The sequence of method steps includes feeding the sheet material in overlapped form, providing a gusset at the fold line, cutting generally V-shaped notches through the gusset and simultaneously seam welding edges of the notches, removing the cut tabs, and cutting the material transversely at the apex of the notches.

It will be noted that the apex of the notch is at or above the folds of the gusset 27. See FIGURE 7. The fingers 72 and 74 may be referred to hereinafter as a means for removing the tax 76. If desirable, other devices may be used in place of the fingers 72, 74, such as a rotating brush, a solenoid plunger, etc.

The present invention may be embodied in other specific forms without departing from the spirit or essential attributes thereof and, accordingly, reference should be made to the appended claims, rather than to the foregoing specification as indicating the scope of the invention.

I claim:

1. In a method of making bags of thermoplastic material comprising the steps of positioning the four layers of a gussett between an anvil and a welder, cooling the anvil, cutting generally V-shaped notches in all four layers and simultaneously seam welding edges of the notches at spaced points along the gusset by said welder, removing the cut V-shaped tab, and then moving said material to a cutting station, and then cutting the sheet material transversely at spaced points corresponding generally to the apex of the notches while simultaneously seam welding the transverse cuts.

2. A method in accordance with claim 1 wherein the step of removing the cut tab includes embracing the tab and physically moving it downwardly.

3. A method in accordance with claim 1 wherein said notch cutting step is accomplished in a manner so as to have the notch partially defined by curved edges, and cooling the anvil which cooperates with a heated cutting edge.

4. A method in accordance with claim 1 including folding a flat strip of said material on itself so as to form a single fold line containing a gusset with the edges of the material being transversely spaced so that one layer projects beyond the other layer, thereby forming a tab, performing said notch cutting steps so that the height of the notch is at least equal to the width of the gusset, and providing a slit in the tab while simultaneously performing said notch cutting step.

5. Apparatus for making bags of thermoplastic material comprising means for overlapping the material on itself and providing a gusset at the fold line, a notch welder for intermittently cutting notches at spaced points along the gusset and simultaneously providing seam welds to define the notch before the material is fed to a transverse cutter, said welder having a generally V-shaped cooled anvil below said welder, means for moving said welder toward and away from said anvil to affect cutting and welding material disposed therebetween, means for removing the tabs produced by cutting the notches, transverse cutter means downstream from said notch welder for transversely cutting the material at the apex of the notches while simultaneously seam welding the transverse cuts, means for synchronizing movement of said notch welder and said cutter means for operation while the web is stationary, and means for moving said material intermittently.

6. Apparatus in accordance with claim 5 wherein said means for removing the cut tabs includes means for engaging the tab and moving it downwardly away from the remainder of the sheet material.

7. Apparatus in accordance with claim 6 wherein said notch welder includes a generally V-shaped cutting edge, means for heating the cutting edge, a cooled anvil below the cutting edge and adapted to cooperate therewith, and means for moving the cutting edge toward and away from the anvil.

8. Apparatus in accordance with claim 5 wherein the means for removing the tab includes a pair of fingers mounted in close association with the notch welder so that the fingers may embrace the tab therebetween and move the tab downwardly away from the notch welder.

9. Apparatus in accordance with claim 8 including a power cylinder connected to one of said fingers for causing the fingers to move upwardly and downwardly.

10. Apparatus in accordance with claim 5 including means for intermittently causing simultaneous operation of the notch welder and means for removing the tab.

References Cited
UNITED STATES PATENTS

| | | | |
|---|---|---|---|
| 2,765,713 | 10/1956 | Anness | 93—36 |
| 3,011,295 | 12/1961 | Brugger | 53—372 X |
| 3,023,679 | 3/1962 | Piazze | 93—35 X |

BERNARD STICKNEY, Primary Examiner

U.S. Cl. X.R.

53—372; 83—151; 156—251, 267